Jan. 6, 1953     A. W. RICKENBACH     2,624,512
THERMOPLASTIC REGULATING DEVICE
Filed Nov. 1, 1950     2 SHEETS—SHEET 1
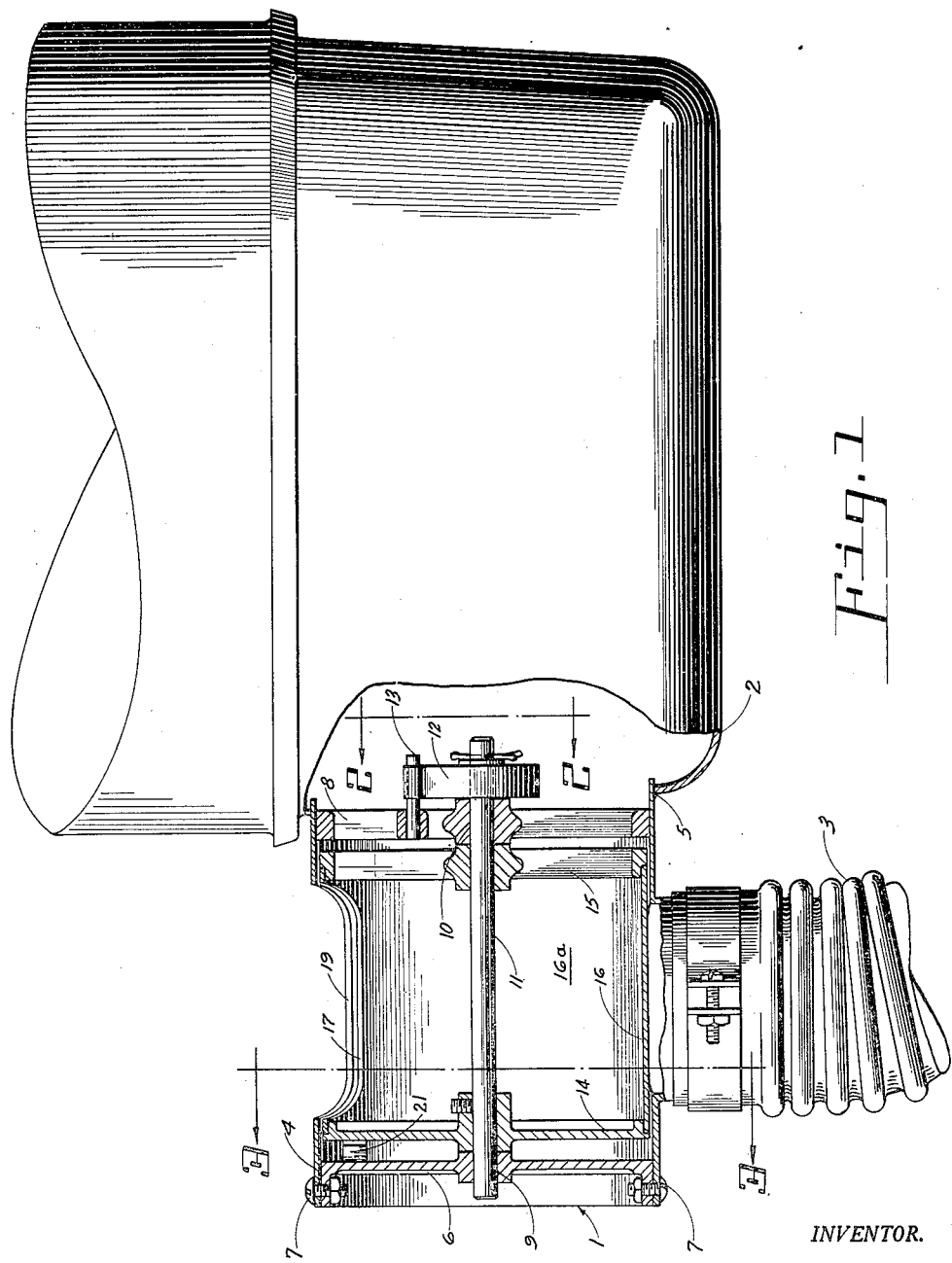
INVENTOR.
AUGUST W. RICKENBACH
BY
Alden D. Redfield
ATTORNEY.

Jan. 6, 1953　　　A. W. RICKENBACH　　　2,624,512
THERMOPLASTIC REGULATING DEVICE

Filed Nov. 1, 1950　　　　　　　　　　　2 SHEETS—SHEET 2

INVENTOR.
AUGUST W. RICKENBACH
BY
Alden D. Redfield
ATTORNEY.

Patented Jan. 6, 1953

2,624,512

UNITED STATES PATENT OFFICE 2,624,512

THERMOSTATIC REGULATING DEVICE

August W. Rickenbach, Williamsport, Pa., assignor to Avco Manufacturing Corporation, Cincinnati, Ohio, a corporation of Delaware Application November 1, 1950, Serial No. 193,403

5 Claims. (Cl. 236—12)

The present invention relates to carburetor air temperature controls and has more particular reference to a thermostatic control for regulating the temperature of the air being supplied to the carburetor of an internal combustion engine.

Since the advent of the internal combustion engine, many devices have been proposed for regulating carburetor air temperature. These devices have been perfected over many years until today carburetion for engines is satisfactory for most normally encountered operating conditions. However, with the evolution of special installations for use in extreme climates, many of the previously used devices no longer produce satisfactory carburetion with the result that the associated engines can not be started or do not operate properly.

There is an extremely exacting application for carburetor air temperature controls on engines which must operate under arctic as well as desert conditions embracing ambient temperatures ranging from minus 65 degrees Fahrenheit to plus 130 degrees Fahrenheit. It has been found in practice that none of the heretofore satisfactory devices are suitable for use over such an extreme range of temperatures; in fact, conventional fuels will not vaporize sufficiently at minus 65 degrees Fahrenheit to support combustion, thus precluding any operation. As a result, a new temperature regulating device had to be evolved which is disclosed in the present application.

In view of the foregoing it is an object of the present invention to provide a mechanism for regulating the temperature of the air being supplied to an internal combustion engine carburetor.

Another object of the present invention is to provide a thermostatically controlled carburetor air regulating device which is automatic in its operation although simple in construction and economical to manufacture.

A still further object of the present invention is the provision of a thermostatic regulating device of the type disclosed which will regulate the temperature of the air being supplied to the carburetor of an internal combustion engine, so that its temperature can be maintained at a minimum value of 80 degrees to 90 degrees Fahrenheit, thereby preventing carburetor icing and erratic engine operation which is highly undesirable under certain operating conditions.

A particular advantage of the present invention is that its simple construction renders unnecessary any delicate adjustment and assures continued satisfactory operation over a wide range of operating conditions without adjustments of any sort.

The herein disclosed device comprehends the provision of a rotatable drum actuated by a bi-metallic spiral spring to open selectively cold air and hot air ports formed in a surrounding cylindrical housing, whereby cold and hot air can be mixed as required to maintain the carburetor air temperature within predetermined limits at all times.

Thus another object of the present invention is to provide a thermostatically controlled device for mixing cold and hot air in predetermined portions as required to maintain carburetor air temperature within prescribed limits.

Another object of the present invention is the arrangement of a thermostatic control in series with a filter whereby the temperature-regulated air mixture is filtered by a single filter before being supplied to the carburetor.

The novel features that are considered characteristic of the present invention are set forth in the appended claims; the invention itself, however, both as to its organization and method of operation, together with additional objects and advantages thereof will best be understood from the following description of a specific embodiment when read in conjunction with the accompanying drawings, in which:

Fig. 1 is an elevational view of the thermostatic regulating device connected to an air filter through which air is supplied to the carburetor of an internal combustion engine. Parts of the regulating device are broken away and shown in vertical section to facilitate an understanding of the invention;

With particular reference to Fig. 1, the present invention comprehends the provision of a thermostatic regulating device, generally designated 1, which is secured to a carburetor air filter 2 through which temperature regulated air flows to an internal combustion engine carburetor (not shown). The device 1 automatically regulates the carburetor air temperature by mixing predetermined quantities of cold ambient air with predetermined quantities of hot air introduced to the device through a flexible hose 3.

Figure 3:
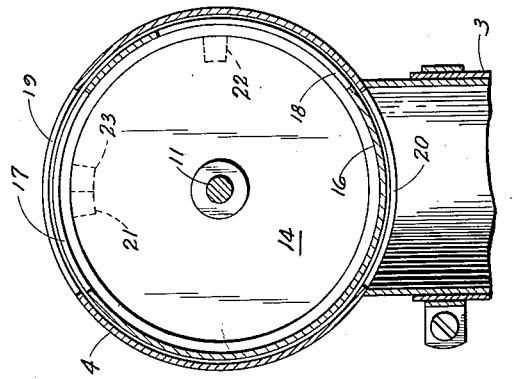
Fig. 3 is a cross sectional view taken on plane 3—3 of Fig. 1 showing the disposition of air ports of the regulating device when supplying ambient air to the engine carburetor.
Figure 4:
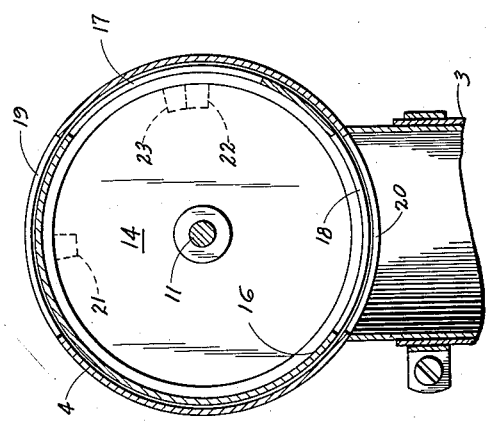
Fig. 4 is a cross sectional view taken on the same plane as Fig. 3 showing the regulating device positioned to feed hot air to the engine carburetor.
Figure 2:
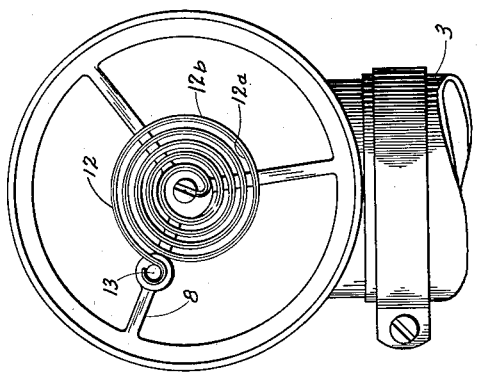
Fig. 2 is an elevational view taken on plane 2—2 of Fig. 1 showing a bi-metallic spiral spring associated with the regulating device.

The regulating device comprises a cylindrical body 4 which is rigidly attached, as by welding, to the side wall of the filter at 5. Body 4 is strengthened by an end cap member 6 which is bolted to the body at 7 and by a stationary spider 8, secured within the body adjacent the air filter. Cap 6 and spider 8 are formed to define aligned centrally disposed bearings 9 and 10 for rotatably supporting shaft 11 which is adjusted in angular position by a bi-metallic spiral spring 12, one end of which is anchored to the end of shaft 11, the other end being anchored to a pin 13 secured to and projecting from spider 8. Secured to shaft 11 for conjoint rotation are disc 14 and spider 15 to the peripheries of which is secured a shell 16 forming a drum 16a. With particular reference to Figs. 3 and 4 it will be noted that drum 16a is formed to define cold and hot air supply ports 17 and 18, respectively. These ports cooperate with corresponding ports 19 and 20 formed within body 4 of the regulating device. The internal combustion engine (not shown) induces a flow of air through filter 2 which causes air to flow into the filter through ports 19 and 20 as permitted by the registry therewith of ports 17 and 18, respectively. Cold ambient air is drawn through port 19 from the surroundings. Hot air is drawn through port 20 from flexible hose 3 which in turn is supplied from some warm part of the engine, such as from around the cylinders of an air cooled engine. The mixture of cold and hot air is automatically proportioned by the present device so as to maintain the mixture temperature of the air passing through filter 2 at a minimum value of 80 degrees to 90 degrees Fahrenheit. An ordinary internal combustion engine will experience no carburetion difficulty when operating under such conditions.

Bi-metallic spring 12 is composed of two contiguous layers of dissimilar metals, the inner layer 12a of which has a higher thermal coefficient of expansion than the outer layer 12b with the result that the spring tends to unwind and impart counterclockwise rotation to shaft 11 (as viewed in Figs 3 and 4), as the temperature of the air around the spring rises. For any given temperature of the spring, a predetermined position of shaft 11 is established.

A study of Figs. 3 and 4 will reveal that ports 17 and 18 are so positioned relative to the ports formed in the body that when port 18 registers fully with port 20, port 17 is totally out of registry with port 19 (see Fig. 4). Similarly when ports 17 and 19 are aligned, ports 18 and 20 are completely out of registry (see Fig. 3). It is noteworthy that ports 17 and 18 are so positioned that a partial registry of ports 17 and 19 as well as ports 18 and 20 can occur simultaneously. Thus, three general operational conditons may exist.

1. Ports 18 and 20 in complete alignment so that the air flowing to filter 2 is drawn entirely through port 20 from hose 3;

2. Ports 17 and 19 in complete alignment so that air for filter 2 is drawn through port 19 entirely from the surroundings of the control device; and 3. Partial registry of ports 17 and 19 as well as ports 18 and 20 so that the air drawn into filter 2 comprises a mixture of ambient cold air and hot air.

It has been found desirable to provide on end cap 6 stationary stop lugs 21 and 22 (see Figs. 3 and 4) between which a movable stop lug 23, secured to disc 14, may move as drum 16a is rotated by the spring. These stop members limit the extreme positions of the drum to those shown in Figs. 3 and 4.

It will be obvious to those versed in the art that the extremes of the regulated temperature which can be maintained by the present control device are limited by the ambient temperature and temperature of the hot air which is available. In view of the fact that ambient temperatures seldom, if ever, exceed 130 degrees Fahrenheit regardless of the climatic conditions, it is obvious that the present control device can maintain the carburetor air at a temperature at or below 130 degrees Fahrenheit at all times. It will also be obvious that the hot air being supplied to the control device must exceed 80 degrees Fahrenheit at all times if the carburetor air is to be maintained in excess of this value. This latter requirement is easily met during operation of an internal combustion engine where the spent cooling air therefrom usually is considerably in excess of 80 degrees Fahrenheit.

During starting, prior to any operation of the engine, it is necessary to obtain warm air for the control device from some supplemental warm air source such as is often used for preheating an engine before it is started under arctic conditions. The necessity for this supplemental heat source is not a disadvantage of the present invention since any internal combustion engine must be preheated for a considerable period before any operation is possible in extremely cold climates.

It has been found in practice that the device disclosed herein responds rapidly to changes of temperature. Thus, the temperature of the air being supplied to the associated internal combustion engine can be held within desired limits regardless of the changes occurring in the temperatures of the hot and cold air supplies.

Responsiveness of the present control device to temperature changes is enhanced by the location of the bi-metallic spring 12 directly in the temperature regulated air stream, flowing through spiders 8 and 15 to filter 2. Since the spiral spring is directly in the air stream it is subjected to the mixture temperature at all times.

It has been found desirable to balance drum 16a so that no forces exist to induce rotation of shaft 11 regardless of the drum's position. In this way rotation of the drum is entirely under the control of bi-metallic spring 12.

When this device is used under arctic conditions it is desirable to eliminate all forms of lubrication from bearings 9 and 10 since all ordinary lubricants become solid at the temperatures encountered. By balancing the drum and eliminating lubricant from bearings 9 and 10, satisfactory operation of the control device is assured under all operating conditions.

Having described a preferred embodiment of my invention I claim:

1. A thermostatic control device for use in supplying temperature-regulated carburetor air to an internal combustion engine regardless of climatic conditions, said device comprising a stationary cylindrical body, a cap member closing one end of said body, a spider disposed within the opposite end of said body, said body being formed to define a pair of ports in its side wall, one of said ports being in communication with a cold air supply, the other of said ports being in communication with a hot air supply, a drum rotatably and concentrically disposed within said cylindrical body, said drum being formed to define a pair of ports for registry with said first named pots, a thermostatic bi-metallic spring for imparting rotation to said drum whereby for each temperature of said spring a predetermined position of said drum is established with said first and second named ports in predetermined registry for controlling the flow of predetermined quantities of hot and cold air to the interior of said drum, said spring being subjected to the resulting mixture temperature within said drum, one end of said spring being secured to said spider and the other end being connected to said drum.

2. A thermostatic control device for use in supplying temperature regulated carburetor air to an internal combustion engine regardless of prevailing climatic conditions, said device comprising a stationary hollow cylindrical body, a cap member closing one end of said body, a spider disposed within the open end of said body, said body being formed to define a pair of ports in its side wall, one of said ports being in communication with a cold air supply, the other of said ports being in communication with a hot air supply, a rotatable drum concentrically disposed within said cylindrical body, said drum being formed to define a pair of ports for registry with the first named ports, a transverse shaft coaxially disposed within said cylindrical body and rotatably supported by said cap member and said spider, said drum being secured to said shaft for conjoint rotation within said body, a thermostatic bi-metallic spring for imparting rotation to said drum, one end of said spring being anchored to said spider, the other end of said spring being secured to said shaft whereby for each temperature of said spring a predetermined position of said drum is established with the first and second named ports in predetermined registry for controlling the flow of predetermined quantities of hot and cold air to the interior of said drum.

3. A temperature regulating device for use with a carburetor and an associated air filter through which air flow is induced by an internal combustion engine, said regulating device comprising a stationary hollow cylindrical body secured to and projecting from said filter, a cap member secured to the projecting end of said body, the other end of said body being secured to the filter, said body being formed to define ports in its side wall in communication with hot and cold air supplies, a spider fixedly secured in the open end of said body adjacent the filter, a shaft coaxially disposed within said body rotatably supported by said cap member and said spider, a rotary drum concentrically positioned within said body and secured to said shaft for conjoint rotation therewith, said drum being formed to define ports for registry with the ports of said body, a bi-metallic spiral spring disposed within the filter and having its ends secured, one to said shaft and the other to said spider for imparting predetermined rotation to said drum, said spring being subjected to the mixture temperature of the air flowing through said ports and into the filter 4. A thermostatic control device for use in supplying temperature-regulated carburetor air to an internal combustion engine regardless of prevailing climatic conditions, said device comprising a stationary cylindrical body closed at one end and open at the other end, a stationary support at the open end of said body permitting airflow therethrough, said body being formed to define a pair of ports in its cylindrical side wall, one of said ports being in communication with a cold air supply, the other of said ports being in communication with a hot air supply, a shaft concentrically positioned within said body and supported by said support, a drum concentrically disposed within said body and supported by said shaft, said drum being formed to define a pair of ports for registry with said first named ports, a thermostatic bi-metallic spring for imparting rotation to said drum whereby for each temperature of said spring a predetermined position of said drum is established with said first and second named pairs of ports in predetermined registry for controlling the flow of predetermined quantities of hot and cold air to the interior of said drum and through the open end of said body, said spring being subjected to the resulting mixture flowing through said drum, one end of said spring being secured to said shaft and the other end to said support.

5. A thermostatic control device for use in supplying temperature-regulated carburetor air to an internal combustion engine regardless of prevailing climatic conditions, said device comprising a stationary cylindrical body closed at one end and open at the other end, a stationary support at the open end of said body permitting airflow therethrough, said body being formed to define a pair of ports in its cylindrical side wall, one of said ports being in communication with a cold air supply, the other of said ports being in communication with a hot air supply, a shaft concentrically positioned within said body and supported by said support, a drum concentrically disposed within said body and supported by said shaft, said drum being formed to define a pair of ports for registry with said first named ports, a thermostatic bi-metallic spring for imparting rotation to said drum whereby for each temperature of said spring a predetermined position of said drum is established with said first and second named pairs of ports in predetermined registry for controlling the flow of predetermined quantities of hot and cold air to the interior of said drum and through the open end of said body, said spring being subjected to the resulting mixture flowing through said drum, one end of said spring adjustably positioning said drum and the other end being fixed relative to said body.

AUGUST W. RICKENBACH.

REFERENCES CITED

The following references are of record in the file of this patent:

UNITED STATES PATENTS

| Number | Name | Date |
| --- | --- | --- |
| 1,797,113 | Whatmough et al. | Mar. 11, 1931 |
| 1,858,454 | Lund | May 17, 1932 |
| 1,925,686 | Chism | Sept. 5, 1933 |
| 2,225,210 | Dillon | Dec. 17, 1940 |
| 2,473,097 | Hamill | June 14, 1949 |